United States Patent
Li et al.

(10) Patent No.: US 8,805,178 B2
(45) Date of Patent: Aug. 12, 2014

(54) SYSTEM FOR REDUCING LENS VIBRATION

(75) Inventors: Jingqiang Li, Austin, TX (US); Young Lee, San Diego, CA (US); Dennis C. Lee, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 13/478,925

(22) Filed: May 23, 2012

(65) Prior Publication Data

US 2012/0230666 A1 Sep. 13, 2012

Related U.S. Application Data

(62) Division of application No. 12/031,414, filed on Feb. 14, 2008, now Pat. No. 8,190,015.

(60) Provisional application No. 60/970,765, filed on Sep. 7, 2007.

(51) Int. Cl.
  *G03B 3/10* (2006.01)
  *G03B 13/34* (2006.01)

(52) U.S. Cl.
  USPC .......................................................... 396/135

(58) Field of Classification Search
  USPC ...................... 396/75, 89, 90, 133, 135, 136;
  310/12.17, 49.01
  See application file for complete search history.

(56) References Cited

U.S. PATENT DOCUMENTS

| | | | | |
|---|---|---|---|---|
| 4,072,888 A | * | 2/1978 | Bechtle et al. | 318/685 |
| 4,303,321 A | * | 12/1981 | Enomoto et al. | 396/98 |
| 4,908,645 A | | 3/1990 | Higashihara et al. | |
| 5,083,150 A | | 1/1992 | Nagasaki et al. | |
| 5,179,407 A | | 1/1993 | Kusaka et al. | |
| 5,208,625 A | | 5/1993 | Suekane | |
| 5,225,940 A | | 7/1993 | Ishii et al. | |
| 5,430,287 A | * | 7/1995 | Kusaka | 250/201.5 |
| 5,594,311 A | * | 1/1997 | Yasuda et al. | 318/685 |
| 5,689,283 A | * | 11/1997 | Shirochi | 345/698 |
| 5,696,999 A | * | 12/1997 | Matsushima et al. | 396/55 |
| 5,873,006 A | | 2/1999 | Iwane | |
| 6,094,537 A | | 7/2000 | Okazaki et al. | |

(Continued)

FOREIGN PATENT DOCUMENTS

| | | |
|---|---|---|
| CN | 1773741 A | 5/2006 |
| CN | 101140350 A | 3/2008 |

(Continued)

OTHER PUBLICATIONS

International Search Report and the Written Opinion—PCT/US2008/075268, International Search Authority—European Patent Office—Sep. 11, 2009.

*Primary Examiner* — Clayton E LaBalle
*Assistant Examiner* — Warren K Fenwick
(74) *Attorney, Agent, or Firm* — James R. Gambale, Jr.

(57) ABSTRACT

Described herein is a system for reducing vibration of a lens. One way to reduce vibration is through a programmable processor configured to divide a lens movement requirement into smaller lens movements and then insert a wait time after completing the smaller lens movements. The smaller lens movements can be repeated for subsequent smaller lens movements until all the remaining smaller lens movements have been completed. The system may include an actuator configured to move the lens; and wherein the lens movements are completed within a processing time of one image frame.

20 Claims, 9 Drawing Sheets

(56) References Cited

U.S. PATENT DOCUMENTS

| | | | |
|---|---|---|---|
| 6,285,154 B1* | 9/2001 | Yasuda et al. | 318/685 |
| 6,510,121 B2* | 1/2003 | Ijima et al. | 720/684 |
| 6,642,687 B2* | 11/2003 | Aoshima | 318/696 |
| 6,963,366 B2* | 11/2005 | Okawara | 348/240.99 |
| 7,158,182 B2 | 1/2007 | Watanabe et al. | |
| 7,184,090 B2 | 2/2007 | Watanabe et al. | |
| 7,262,804 B2 | 8/2007 | Watanabe | |
| 7,428,378 B1 | 9/2008 | Warpakowski Furlan | |
| 7,474,846 B2 | 1/2009 | Subbotin | |
| 7,574,126 B2* | 8/2009 | Honjo et al. | 396/97 |
| 7,671,493 B2* | 3/2010 | Takashima et al. | 310/15 |
| 7,835,637 B2 | 11/2010 | Li et al. | |
| 8,190,015 B2* | 5/2012 | Li et al. | 396/135 |
| 2002/0106205 A1 | 8/2002 | Kikuchi et al. | |
| 2003/0099044 A1 | 5/2003 | Fujii | |
| 2005/0134720 A1 | 6/2005 | Lee | |
| 2005/0174910 A1 | 8/2005 | Lee | |
| 2006/0018650 A1 | 1/2006 | Ichimiya | |
| 2006/0153554 A1* | 7/2006 | Misawa et al. | 396/55 |
| 2007/0108847 A1* | 5/2007 | Chang | 310/12 |
| 2007/0122133 A1* | 5/2007 | Shiratori | 396/55 |
| 2007/0147817 A1 | 6/2007 | Li et al. | |
| 2008/0031609 A1* | 2/2008 | Rukes | 396/89 |
| 2008/0055753 A1* | 3/2008 | Takahashi et al. | 359/824 |
| 2008/0130134 A1 | 6/2008 | Ishida et al. | |
| 2008/0164771 A1* | 7/2008 | Huang | 310/12 |
| 2011/0013899 A1* | 1/2011 | Nagai et al. | 396/133 |

FOREIGN PATENT DOCUMENTS

| | | |
|---|---|---|
| DE | 4006592 A1 | 9/1990 |
| EP | 0565338 A2 | 10/1993 |
| EP | 1855135 A1 | 11/2007 |
| JP | 62293526 | 12/1987 |
| JP | S63177105 A | 7/1988 |
| JP | 3020707 | 1/1991 |
| JP | H0876001 A | 3/1996 |
| JP | H08234088 A | 9/1996 |
| JP | 2004246013 A | 9/2004 |
| JP | 2006227101 A | 8/2006 |
| JP | 2006243745 A | 9/2006 |
| JP | 2008064937 A | 3/2008 |
| KR | 100691245 | 2/2007 |
| WO | 2006049039 | 5/2006 |

* cited by examiner

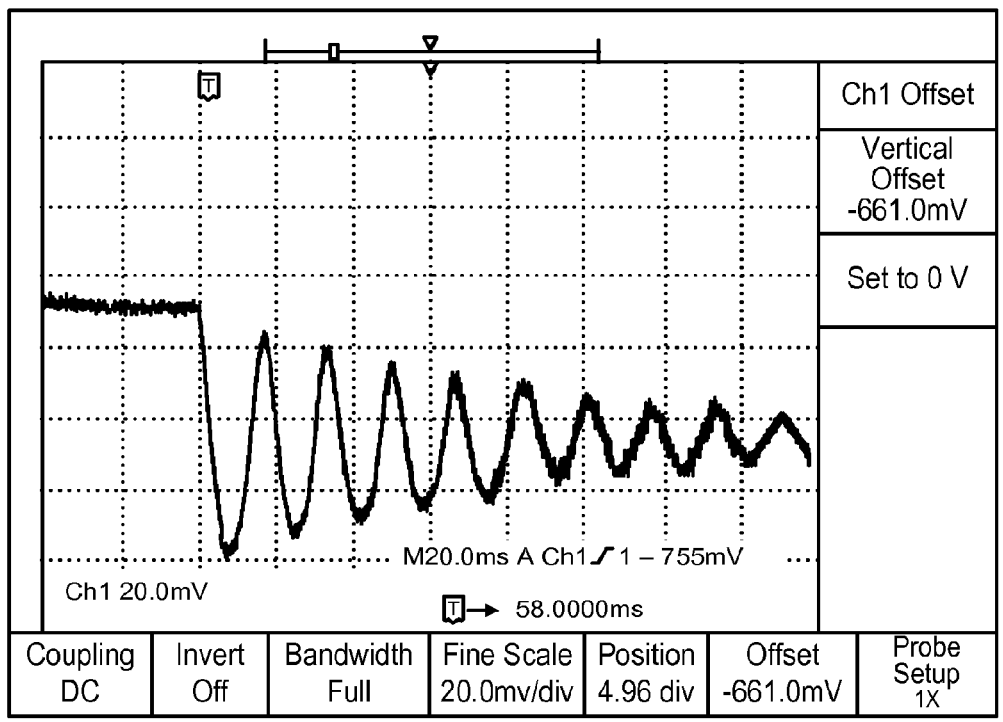
FIG. 8 -- Conventional Art
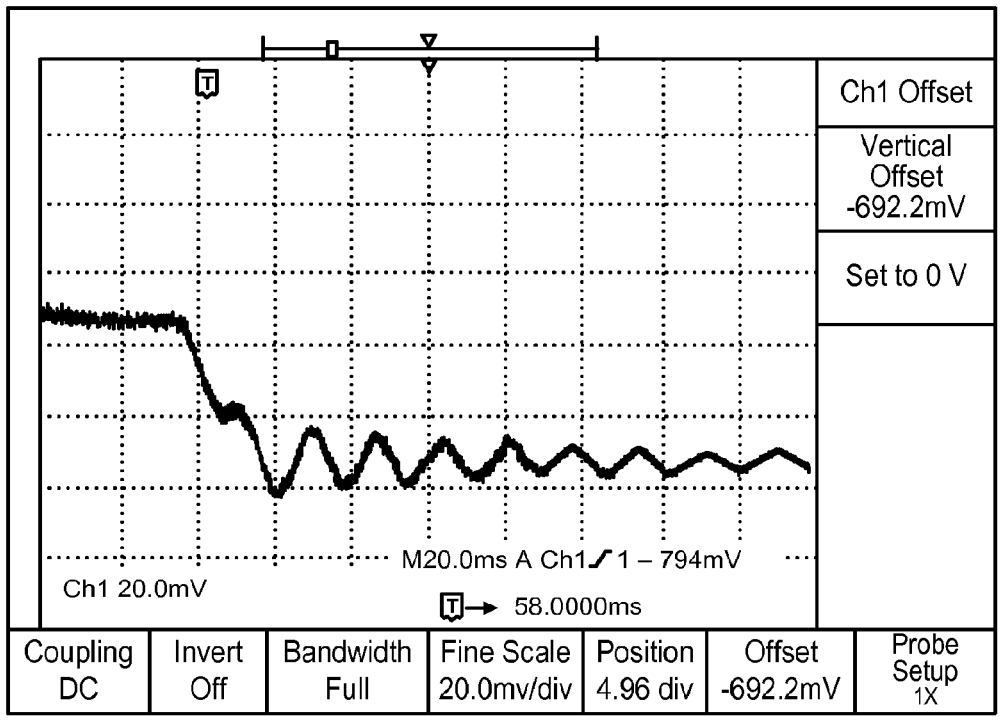
FIG. 9

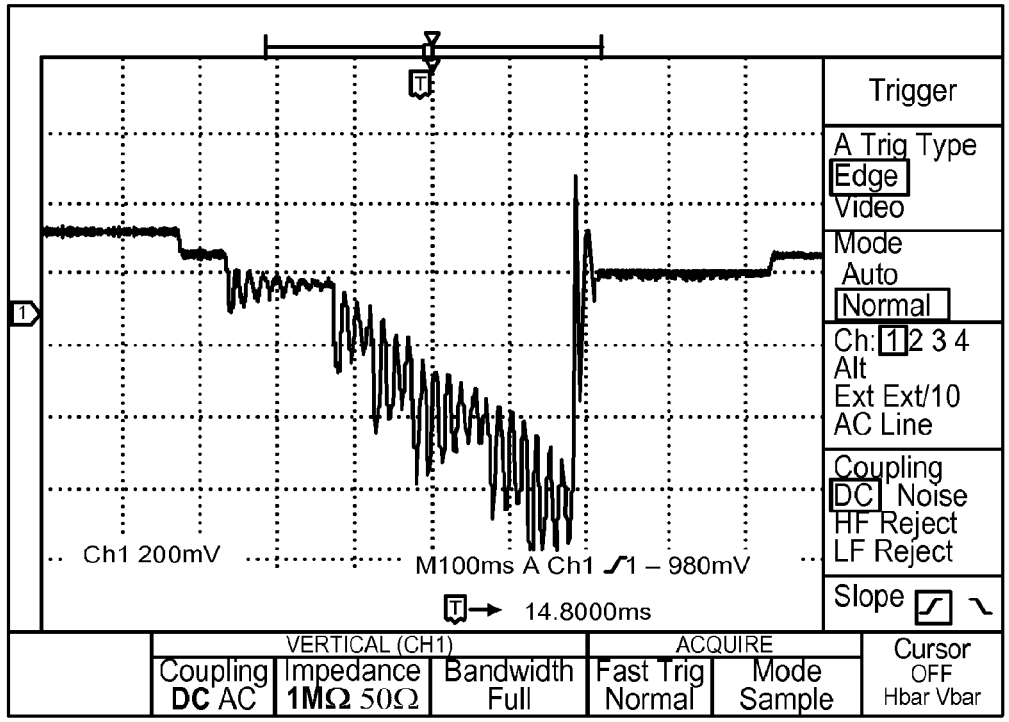
FIG. 10 -- Conventional Art
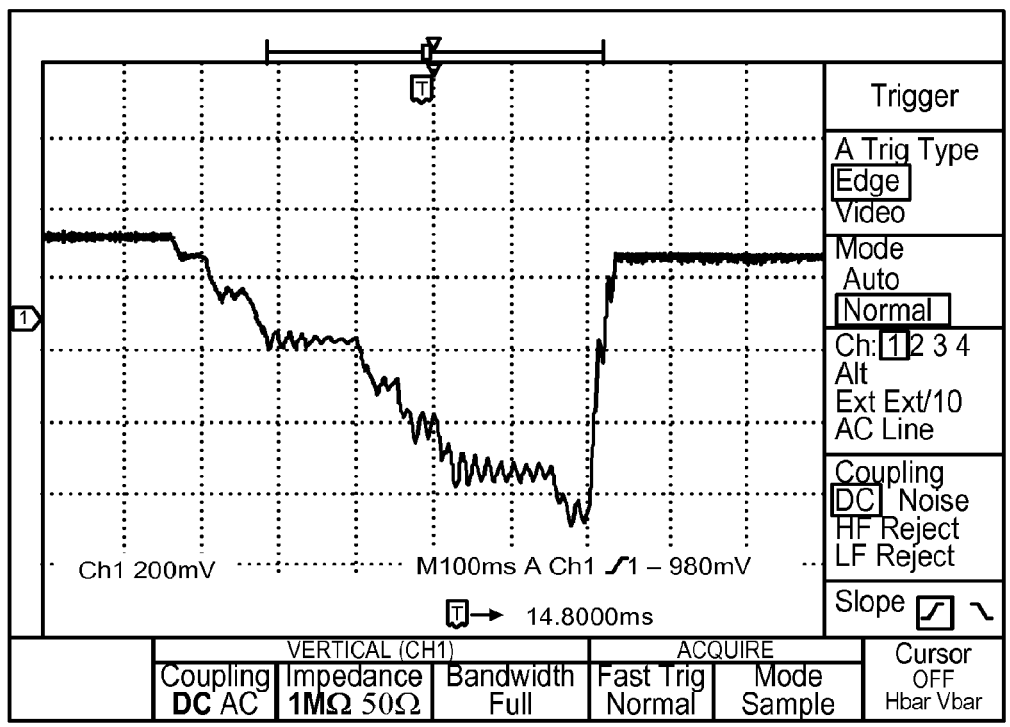
FIG. 11

SYSTEM FOR REDUCING LENS VIBRATION

RELATED APPLICATIONS

This application is a divisional of U.S. patent application Ser. No. 12/031,414 entitled "METHOD AND DEVICE FOR DAMPING LENS VIBRATION" filed Feb. 14, 2008 which claims the benefit of U.S. Provisional Application No. 60/970,765 filed on Sep. 7, 2007, each of which are hereby expressly incorporated by reference.

FIELD OF DISCLOSURE

Embodiments in general are related to a method and device for damping vibration imparted to a lens of an image capture device during lens movement, and more particularly, to damping vibration in springs of a voice coil motor designed to move the lens in the image capture device.

BACKGROUND

Image capture devices may have a lens driver controlling an actuator that moves a lens assembly for adjusting focus in the image capture device. On example is a voice-coil motor (VCM). A VCM with spring return is a small, low-cost solution for auto-focusing (AF), and one of the simplest to implement. Movements using VCMs are repeatable and gearless, with lens position fixed by balancing motor and spring forces. The spring returns the lens to the infinite-focus position, and no power is dissipated unless focusing is required. A VCM is mechanically robust, shock-resistant, and has low-cost mechanics. VCMs can be used as a short-distance actuator in electronic devices such as the vibrating motor for a mobile phone, the vertical displacement actuator of a magnetic head or an optical pickup, the auto-focusing actuator for a camera, etc.

FIG. 1 is an exploded perspective view of a conventional voice coil motor (VCM) used in an image capture device for auto focusing (AF). As shown, the VCM includes an upper cover 100, a lower cover 105, and an outer frame 110 having four inner wall surfaces provided with a magnet 115 each, an internally threaded lens barrel 120 for a lens 125 to screw into, a coil 130 wound around an outer side of the lens barrel 120, an upper spring 135 and a lower spring 135. The lens barrel 120 is supported by the upper and the lower springs 135 to movably locate within the outer frame 110 and be surrounded by the four magnets 115.

In operation, as coil 130 is supplied with a current to produce a magnetic field, the lens barrel 120 and the four magnets 115 mutually repulse or attract to thereby produce a push force against the lens barrel 120. Since the lens barrel 120 is supported by the springs 135, the lens barrel 120 is displaced forward or backward within the outer frame 110 by the push force. Thus, the lens 125 position is fixed by balancing motor and spring forces. The springs 135 return the lens 125 to the infinite-focus position.

However, during VCM operation, any movement of lens 125 will cause vibration in the springs 135, known as "ring". This ring occurs as the lens barrel 120 is actuated by the VCM. This ring is present as each of the springs 135 has an intrinsic vibration frequency that causes them to vibrate upon any lens 125 movement during VCM operation.

FIG. 2 is a graph of lens displacement as a function of time to illustrate the effects of ring on lens displacement. The sine wave in FIG. 2 represents an actual measurement, as a function of units of lens displacement over time, taken by an oscilloscope from an actual image capture device. As can be seen in FIG. 2, the continued vibration or ring in the VCM (due to springs 135) after a movement of lens 125 causes the lens 125 to continue to slightly wobble or vibrate for some time after VCM operation terminates (see in FIG. 2 at about 1200 μs on the x-axis). This sine wave indicative of lens displacement, which lessens in amplitude over time, is representative of the ring in an image capture device without any damping.

This vibration or ring can last anywhere from about approximately 50 milliseconds (ms) to approximately 200 ms, and can adversely affect auto-focus (AF) speed and accuracy. Thus, the ring can adversely affect desired image capture settings and hence image quality, if there has not been enough waiting time to permit the lens movement and any generated vibration or ring due to the movement, to terminate or cease prior to capturing an image.

SUMMARY

An embodiment of the present invention is directed to a method for reducing lens vibration in an image capture device. In the method, a lens movement requirement is broken up into N smaller lens move steps, and the lens is moved a first of the N smaller steps. A wait time is inserted after completing the first of the N smaller steps, and then the moving and inserting steps are repeated until the remaining N smaller move steps have been completed.

Another embodiment of the present invention is directed to an image capture device which includes a controller, a lens, an auto-focus (AF) unit for iterating an AF process to determine a lens position for the lens that is sent to the controller, and a voice coil motor for moving the lens under control of the controller in accordance with the determined lens position. The voice coil motor includes springs which impart vibration to the lens during lens movement. The vibration imparted by the springs to the lens is actively dampened during lens movement to the determined lens position.

Another embodiment of the present invention is directed to a method of damping vibration to a lens caused by springs of a voice coil motor in an image capture device as the voice coil motor moves the lens. The springs support the lens in the device. In the method, a lens movement requirement for the lens is divided into N smaller lens move steps, and the lens is moved via the voice coil motor at least one of the N smaller steps to dampen vibration in the springs.

Another embodiment of the present invention is directed to computer-readable medium comprising instructions that cause a processor to determine a lens movement requirement for a lens of an image capture device, the lens actuated by a voice coil motor of the device, the voice coil motor including springs that impart vibration to the lens during lens movement. Additional instructions cause the processor to divide the determined lens movement into N smaller lens move steps, and to send a signal to move the lens in at least one of the N smaller steps to dampen vibration imparted by the springs to the lens.

Another embodiment of the present invention is directed to an apparatus for reducing lens vibration in an image capture device. The apparatus includes means for dividing a lens movement requirement into N smaller lens move steps, means for moving the lens in a first of the N smaller steps, and means for inserting a wait time after completing the first of the N smaller steps. The apparatus further includes means for repeating the moving and inserting steps until the remaining N smaller move steps have been completed.

BRIEF DESCRIPTION OF THE DRAWINGS

The accompanying drawings are presented to aid in the description of embodiments of the invention and are provided solely for illustration of the embodiments and not limitation thereof.

FIG. 8 is an oscilloscope screen shot illustrating a one-step lens movement with no damping.

FIG. 9 is an oscilloscope screen shot illustrating a one-step lens movement with damping in accordance with the example embodiments.

FIG. 10 is an oscilloscope screen shot illustrating results from an AF tracking run in an image capture device in which lens movements were made every frame without damping.

FIG. 11 is an oscilloscope screen shot illustrating results from an AF tracking run in an image capture device in which lens movements were made every frame with damping in accordance with the example embodiments.

DETAILED DESCRIPTION

Figure 1:
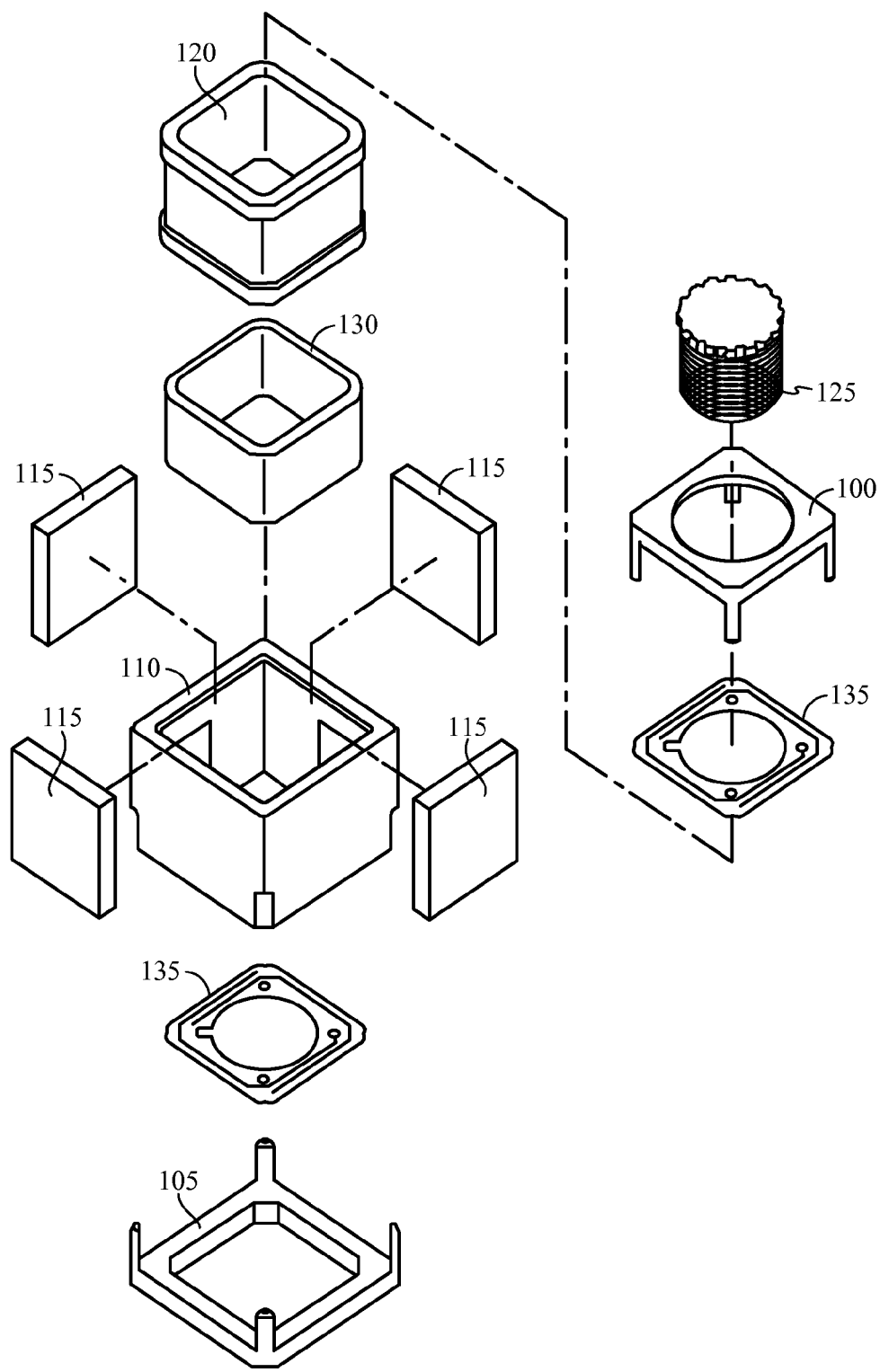
FIG. 1 is an exploded perspective view of a conventional voice coil motor (VCM) used in an image capture device for auto focusing (AF).

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" or "example" is not necessarily to be construed as preferred or advantageous over other embodiments. Likewise, the terms "embodiments" or "embodiments of the invention" do not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

In general, the example embodiments are directed to a method and image capture device that can break a given, determined lens movement in smaller steps in an effort to dampen the ring generated by a VCM, for example, or generated by any other lens movement system of a camera or motor control system for a lens of a camera that causes a ring. By damping the ring, the lens can return to a stable condition faster after a lens movement. This translates into potential improvements in AF speed and overall accuracy, thereby improving image quality in the image capture device. Accordingly, the example embodiments introduce a software solution to limit or dampen the amount of ring or vibration in springs of a VCM during VCM operation in an AF unit of the image capture device to move a lens.

In one example, each small movement of the lens can be controlled by the software at equal timings. In another example, each small movement of the lens can be controlled by the software at different timings. Thus, the timed movement of the lens can be either precise or imprecise in an effort to dampen the ring so as to reduce its effect on the lens.

Figure 3:
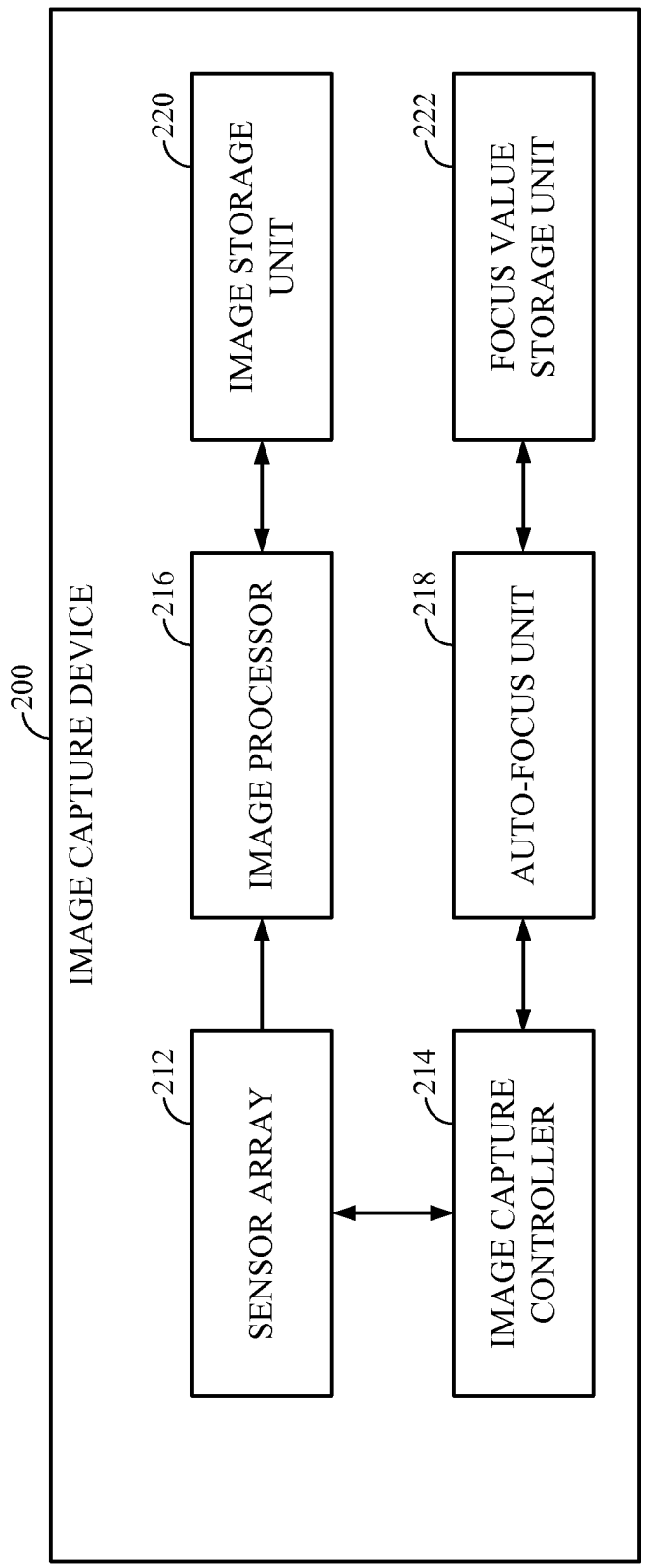
FIG. 3 is a block diagram illustrating an exemplary image capture device for capturing image information from a scene.

FIG. 3 is a block diagram illustrating an exemplary image capture device for capturing image information from a scene. As shown in FIG. 3, image capture device 200 includes a sensor array 212, an image capture controller 214, an image processor 216, an auto-focus unit 218, an image storage unit 220, and a focus value storage unit 222. Although not shown, image capture device 200 may include a voice coil motor for moving the lens such as that shown in FIG. 1, for example. Various components of image capture device 200 can be realized by any suitable combination of hardware and/or software. In the illustrated embodiment, the components are shown as separate units. However, in other embodiments, any of the components may be integrated into combined units within common hardware and/or software. Accordingly, the representation of features as components or modules is intended to highlight particular functional features, and does not necessarily require realization of such features by separate hardware or software.

Image capture device 200 can be a digital camera, such as a digital video camera, a digital still camera, or a combination of both. In addition, image capture device 200 may be a stand-alone device, such as a stand-alone camera, or be integrated in another device, such as a wireless communication device. As an example, image capture device 200 may be integrated in a mobile telephone to form a so-called camera phone or video phone.

Image capture device 200 can be equipped to capture color imagery, black-and-white imagery, or both. The terms "image," "imagery," "image information," or similar terms may interchangeably refer to either video or still pictures.

Likewise, the term "frame" may refer to either a video frame or a still picture frame obtained by image capture device 200.

Sensor array 212 obtains image information for a scene prior to capturing an image frame of the scene. Sensor array 212 includes a two-dimensional array of individual image sensors, e.g., arranged in rows and columns. Sensor array 212 may comprise, for example, an array of solid state sensors such as complementary metal-oxide semiconductor (CMOS) sensors or charge-coupled device (CCD) sensors. The image sensors within sensor array 212 are exposed to the scene to obtain image information for the scene and to capture an image frame of the scene.

Sensor array 212 provides the image information of one or more frames to image processor 216 for storage in image storage unit 220. Sensor array 212 also provides the image information to the image capture controller 214. The image capture controller 214 utilizes the image information for preliminary visual front end (VFE) processing, such as automatic focus (AF) and automatic exposure. For example, image capture controller 214 initiates an AF process at AF unit 218 based on the image information from sensor array 212. The AF process iterated in AF unit 218 calculates focus values at several sampled lens positions and selects the position of the lens for the scene based on the focus values. The selected lens position is associated with the maximum focus value (MAX FV) for the scene.

AF unit 218 may be implemented as an independent hardware component or as a programmable feature of a logic device, such as a microprocessor, DSP or the like. In some embodiments, AF unit 218 may be a programmable or integrated feature of a logic device implementing image processor 216. In particular, AF unit 218 may be implemented as one or more software processes executed by such a logic device.

Image processor 216 receives the captured image frame from sensor array 212 and performs any necessary processing on the image frame. Image processor 216 may, for example, perform filtering, cropping, demosaicing, compression, image enhancement, or other processing of the image frame captured by sensor array 212. Image processor 216 may be realized by a microprocessor, digital signal processor (DSP), application specific integrated circuit (ASIC), field programmable gate array (FPGA), or any other equivalent discrete or integrated logic circuitry. In some embodiments, image processor 216 may form part of an encoder-decoder (CODEC) that encodes the image frame according to a particular encoding technique or format, such as MPEG-2, MPEG-4, ITU H.263, ITU H.264, JPEG, or the like.

Image processor 216 stores the image frame in image storage device 220. Image processor 216 may store raw image frames, processed image frames, or encoded image frames in image storage device 220. If the imagery is accompanied by audio information, the audio also may be stored in image storage device 220, either independently or in conjunction with the image frames. Image storage device 220 may comprise any volatile or non-volatile memory or storage device, such as read-only memory (ROM), electrically erasable programmable read-only memory (EEPROM), or FLASH memory, or such as a magnetic data storage device or optical data storage device.

As noted above, image capture controller 214 utilizes image information for automatic focus (AF) processing, such as by initiating an AF process at AF unit 218 based on the image information from sensor array 212. The AF process iterated in AF unit 218 calculates focus values at several sampled lens positions and selects the position of the lens for the scene based on the focus values. The selected lens position is associated with the maximum focus value (MAX FV) for the scene. The selected lens position is then sent to image capture controller 214, which in turns sends. Although not shown in FIG. 3, image capture controller 214 may then set the selected lens position for the scene by sending a drive signal to the VCM, which moves the lens 125. The springs 135 support the lens 125 during this lens movement, and then return the lens 125 to the infinite-focus position after the lens movement for the selected lens position is completed.

Figure 2:
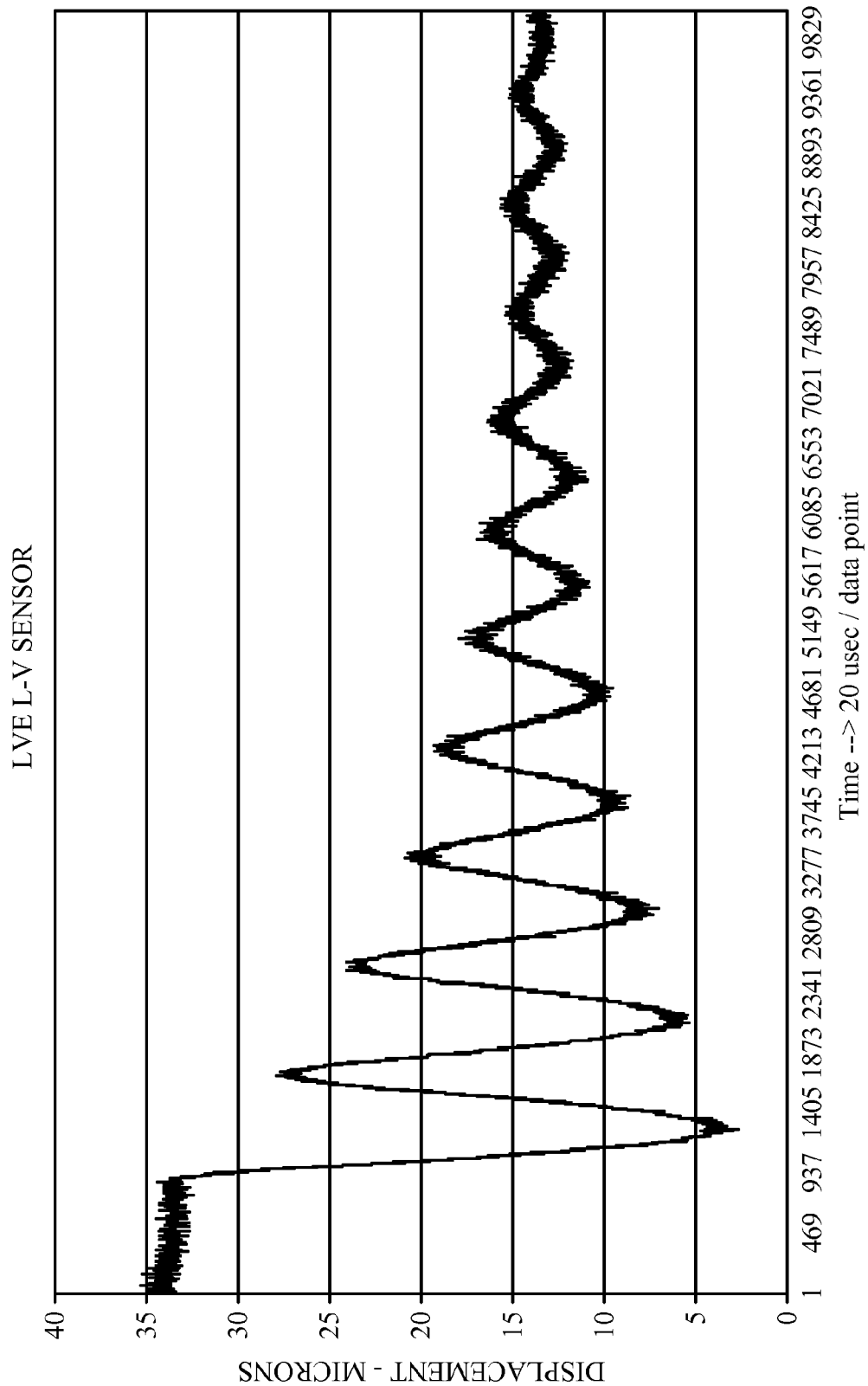
FIG. 2 is a graph of lens displacement as a function of time to illustrate the effects of ring on lens displacement.

The ring or vibration generated in the springs 135 is present due to the fact that during movement of the lens 125 by the VCM, the springs 135 may have an intrinsic vibration frequency ($f_v$). Thus, as the lens 125 moves, vibration from the springs 135 is imparted to the lens 125 via the lens barrel 120. However, the friction between the lens 125 and covers 100/105 of the lens barrel 120 provide a damping mechanism for the vibration; and the small friction gradually reduces the vibration magnitude during the lens movement, as was shown by the decreasing amplitude of lens displacement over time in FIG. 2.

Accordingly, the ring or vibration can be theoretically modeled by the following equation, in which displacement of the lens as a function of time, x(t), can be determined as:

$$x(t) = A \cdot (1 - e^{-\tau \cdot t} \cdot \cos(2\pi f_v t - \phi)),$$

where A is the amplitude of lens displacement, τ is the damping coefficient of the ring and is related to friction, G is the vibration frequency of the springs, and φ is the phase angle relative to the time origin t (i.e., t=0). As φ is a function of the time t it changes for each lens movement. This theoretical equation helps to describe the ring phenomenon that is generated as a function of τ and G.

One assumption for the example methodology is that any of the smaller lens moves (from the larger lens movement commanded by the AF Unit 218) has to be finished all within one frame. For example, in an image capture device having a frame rate of 30 frames per second, any lens movements have to be finished within 33 milliseconds. Another assumption is that precise time interval control is not necessary. In an example, where the time interval between moves (i.e., timing control) is at least 4 milliseconds, up to six smaller lens moves can be made within one frame, i.e., the 33 millisecond time period. Accordingly, the example methodology does not require precise time control in order to perform damping of the ring generated by the springs of the VCM.

Figure 4:
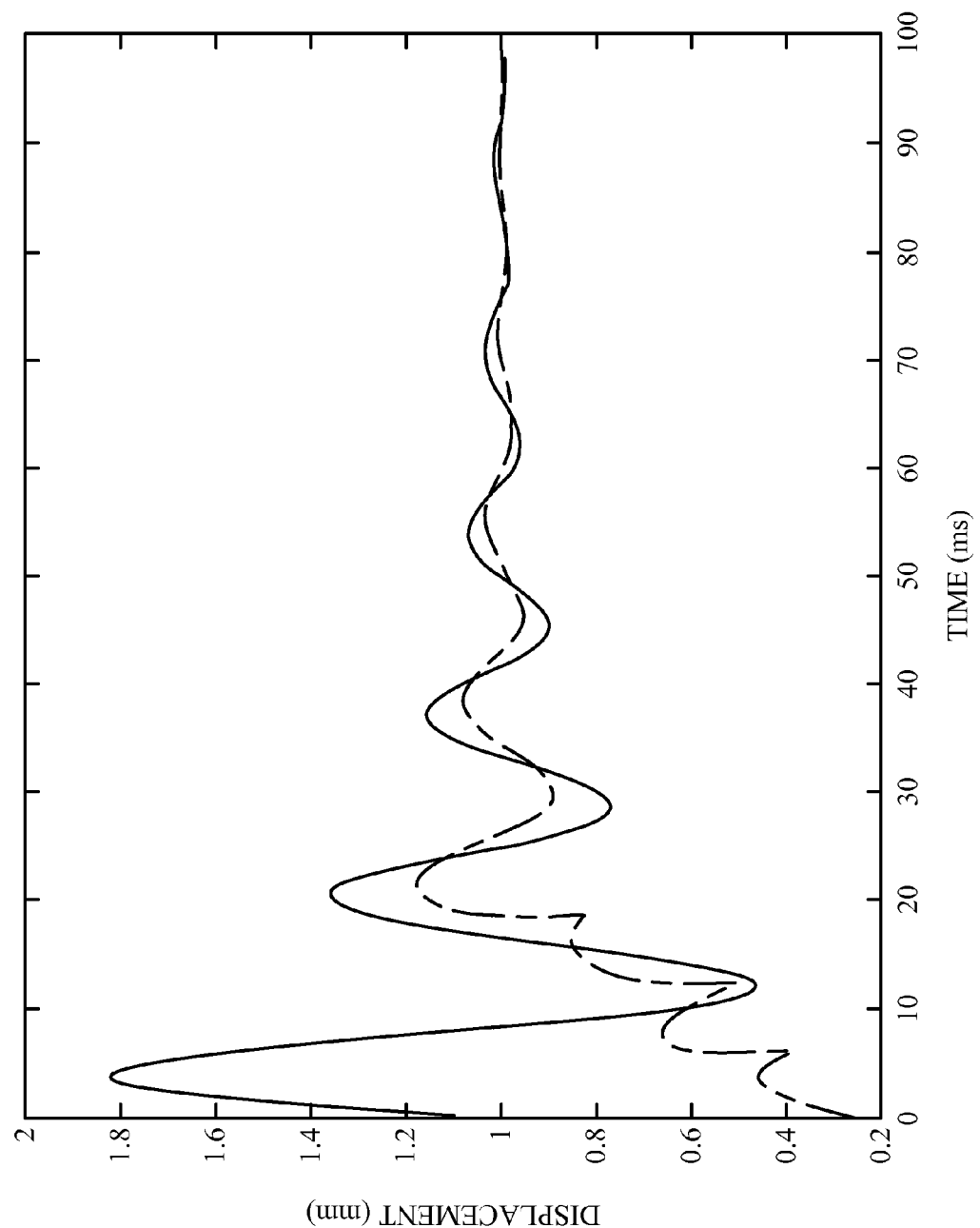
FIG. 4 is a graph of displacement versus time to illustrate ring reduction with precision interval dampening.
Figure 5:
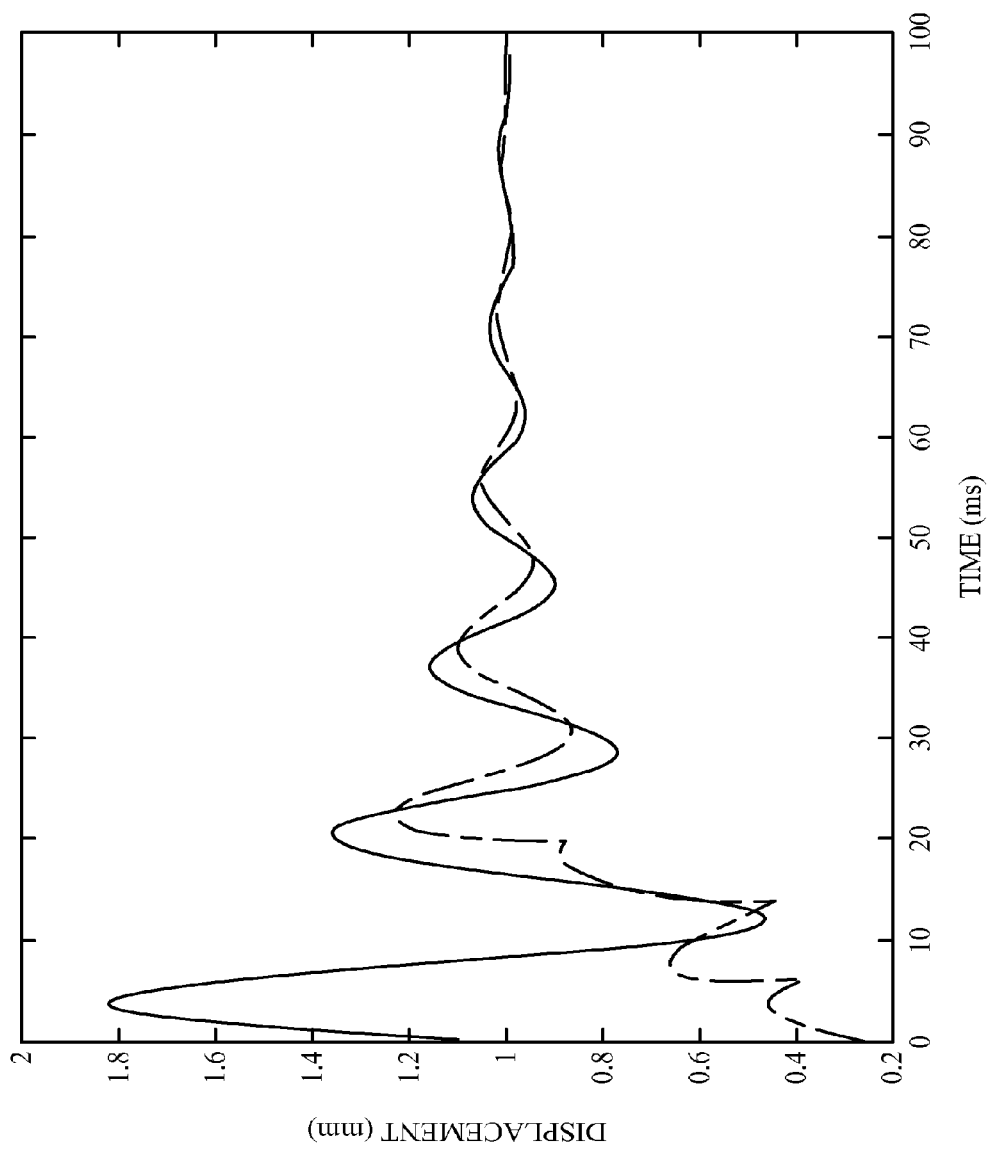
FIG. 5 is a graph of displacement versus time to illustrate ring reduction with non-precision interval dampening.

FIGS. 4 and 5 illustrate graphs of displacement versus time to explain the minor differences in damping of the ring between precision and non-precision interval dampening. Each of FIGS. 4 and 5 show a first solid sine wave of lens displacement without damping, and then a dotted line wave of what the result would look like with damping. In each of FIGS. 4 and 5, the lens displacement x(t) is generated with a damping coefficient τ=0.05 and $f_v$=60 hertz. Each of FIGS. 4 and 5 illustrate a 4-step damping over 25 milliseconds (ms). In other words, a larger lens movement initiated by image capture controller 14 and to be performed by an AF process at AF unit 218 is broken up into 4 smaller lens movement steps over 25 ms.

FIG. 4 shows linear damping of the ring over 25 milliseconds in which the four smaller lens movements are preformed linearly, i.e., in precise time intervals. FIG. 5 illustrates the same 4-steps but with non-precision interval dampening. Accordingly, FIGS. 4 and 5 illustrate that a ring may be dampened by breaking a lens movement up into a number of smaller moves.

In both FIGS. 4 and 5, after 25 ms, the ring has been damped to about the same amplitude since both τ and $f_v$ are the same; the only difference is in the time intervals between the smaller moves. FIG. 5 thus shows that similar damping of the ring can be performed without the precise time control that could necessitate additional hardware and expense. However, the example methodology could be implemented using precise time control.

Figure 6:
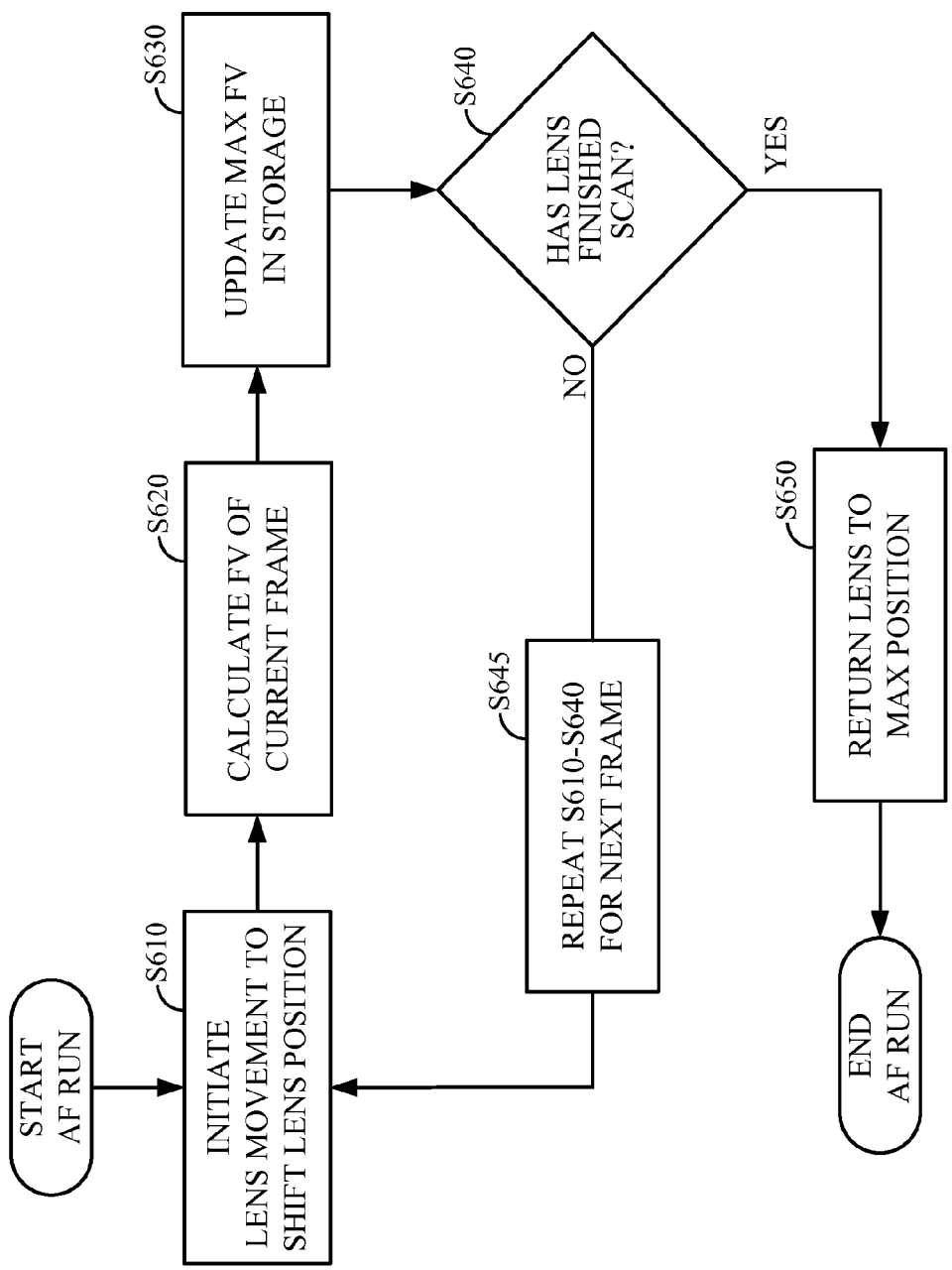
FIG. 6 is a block diagram to illustrate a general AF control algorithm.

FIG. 6 is a block diagram to illustrate a general AF control algorithm, also known as an "AF tracking run" performed by AF unit 218 under the control of image capture controller 214. In general, an AF tracking run may be iterated in AF unit 218 on a frame-by-frame basis to calculate focus values at several sampled lens positions and to select the position of the lens for the scene based on the focus values. The selected lens position is associated with the maximum focus value (MAX FV) for the scene and is sent from AF unit 218 to image capture controller 214. The lens movement in accordance with the selected lens position is made by the VCM based on a drive signal received from image capture controller 214.

Referring to FIG. 6, image capture controller 214, based on a selected lens position determined by AF unit 218, sends a drive signal to the VCM to initiate a lens movement so as to shift position of lens 125 (S610) for a given current frame. Based on the lens movement, the focus value (FV) of the current frame is determined (S620) as a function of the lens position and is stored in the focus value storage unit 222 for evaluation against a maximum FV for the scene (S630), so as to update the MAX FV. The updated MAX FV is then utilized in determining whether or not the lens 125 has finished the scan. If the maximum FV has been reached, the lens 125 has finished the scan (output of S640 is 'YES'), the lens 125 is returned to its maximum position and the AF tracking run is complete.

If the lens 125 has not finished its scan (output of S640 is 'NO'), lens movement is continued for the next frame as indicated at 5645 (i.e., a selected lens position is sent to controller 214 as process functions S610, S620, S630 and S640 are repeated until the lens 125 has finished its scan and is returned to its MAX position (S650), such that the AF tracking run is complete.

Figure 7:
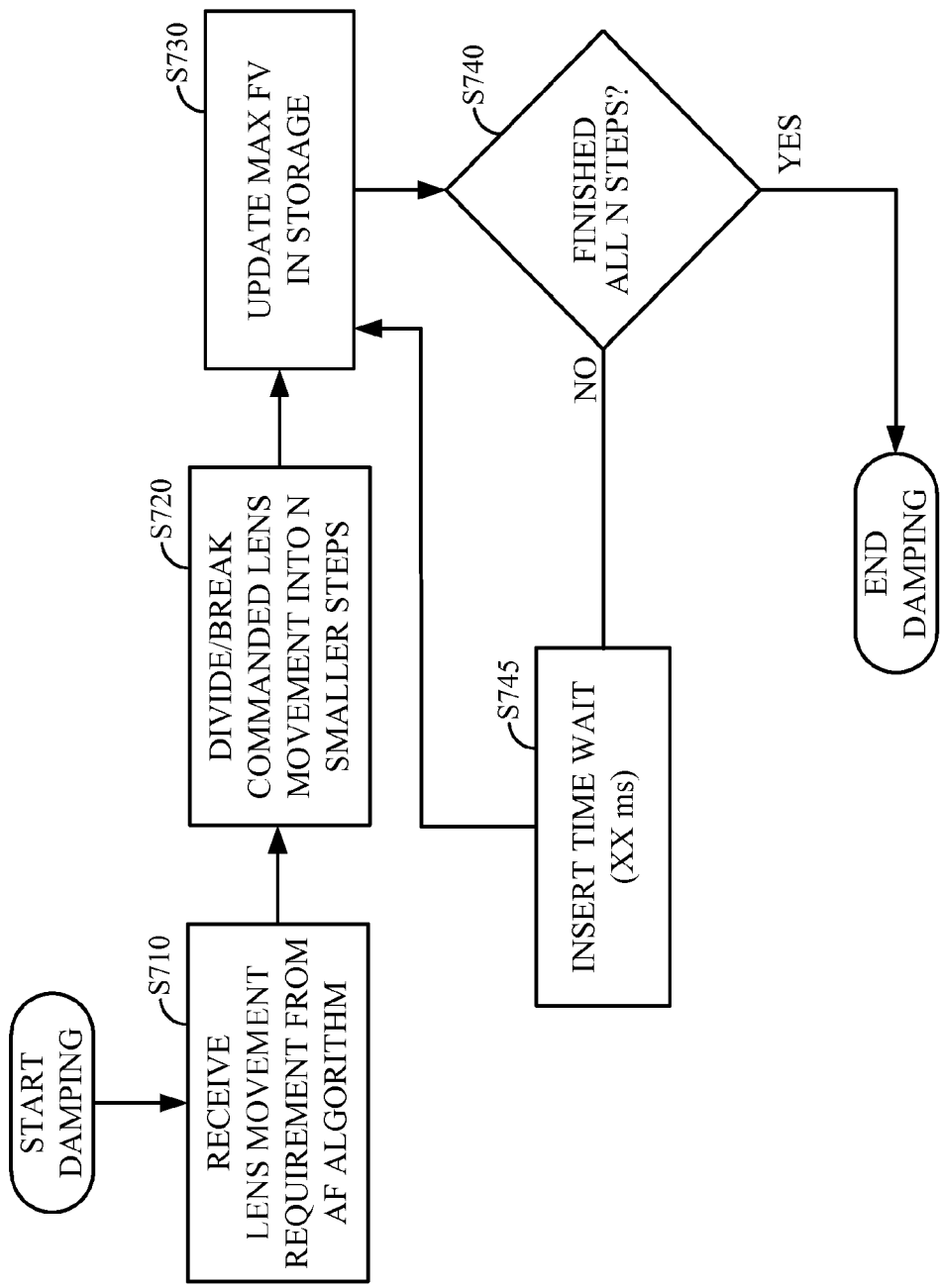
FIG. 7 is a block diagram to illustrate a method of reducing vibration imparted to a lens during movement of the lens in an image capture device.

FIG. 7 is a block diagram to illustrate a method of reducing vibration imparted to a lens during movement of the lens in an image capture device. The example method of providing damping control can be performed for each lens movement requirement received from the AF control or tracking algorithm running in AF unit 218. The example method can be implemented as software by the AF unit 218, although the example methodology could be implemented elsewhere in the image capture device 200, one or more software processes executed by a logic device in image processor 216, for example.

Based on a selected lens position (required lens movement) determined for a frame in an auto-focus process such as a AF tracking run (S710) the determined displacement of the lens movement (in an example, a 100 µm lens move) is broken up or divided (S720) into several smaller displacement steps (in one example, five—20 µm moves) as evenly as possible. Where the example methodology is implemented in the AF unit 218, the AF unit 218 thus divides the determined lens movement requirement for the lens 125 into the N smaller lens move steps.

The example methodology thus specifies a number of smaller steps to move the lens for the selected lens position; breaking up the calculated larger lens movement into several smaller movements. The example methodology thus sets a number N of smaller steps that are to be made for each given lens displacement calculated by the AF tracking run in AF unit 218 for a given frame. The value for N can be a value that is set in advance, for example.

The number of smaller movement steps to perform in moving lens 125 for a given frame is based partly on the time constant or timing control of the controller 214 (i.e., based on the resolution of timing control in the image capture device 200), as well as the processing rate of processing image frames in the image capture device 200. The AF tracking run or algorithm in AF unit 218 pre-calculates the lens displacement for each frame. For example, if the AF unit 218 processes frames at a rate of 30 frames per second, all of the N smaller lens movements are to be performed within 33 milliseconds, i.e., the amount of time it takes to process a single frame.

In the method, the lens 125 is moved by the VCM (under control of controller 214) in accordance with at least one of the smaller steps (S730), and then it is queried (S740) whether or not all steps have been completed (S740). In this respect, the example methodology can increment a counter to keep track of the smaller lens movements. If all N steps are not complete, a time wait is inserted (S745) before a next smaller step of lens movement (S730) is performed. The wait time permits the lens 125 to stabilize before a next lens movement. For each of the N smaller lens movements, a drive signal is sent by the controller 214 to the voice coil motor to move the lens 125.

The wait time in one example can be determined as a function of the frequency of the ring $f_v$ of the springs. Although the exact $f_v$ is not necessarily known for a given image capture device, the wait time may be selected to dampen a ring which has a $f_v$ between about 40 Hz to 70 hz, which is an expected frequency range of ring determined empirically from known frequency responses of lens control systems. As noted above, the wait time permits the lens 125 to stabilize between moves. In other words, selection of the wait time can be selected to ensure that the phase angles φ between two moves substantially cancel each other out (i.e., approximately about 180° out of phase between $φ_n$ and $φ_{n+1}$) so as to dampen the ring prior to making the next smaller lens move.

In one example, the wait time can be different between lens moves; i.e., variable, as precise timing control is not required to provide software damping control of the springs 135 and hence lens 125. In another example, the wait time between moves may be set up to about 5 ms, although other time intervals may be used. For example, setting the wait time to a shorter time frame such as 2 ms or less allows several more smaller lens movements to be performed; whereas a larger wait time such as 3, 4 or 5 ms or more between moves limits the number of smaller lens movements that can be performed.

Thus, in determining the number N of smaller lens movements the designer evaluates one or more of the time constant or timing control of the controller 214, the processing rate of processing image frames in the image capture device 200, and the amount of wait time needed to ensure that the phase angles between two moves substantially cancel each other out so as to dampen the ring prior to making a next smaller lens move. The smaller lens movements, inclusive of wait time between moves, should all be completed within the processing time of a single frame.

Once all N smaller steps have been completed (output of S740 is 'YES'), the process is complete. By breaking a larger required lens movement into smaller steps, the ring in the springs 135 can be dampened.

FIGS. 8 and 9 are oscilloscope screen shots illustrating the difference between a one-step lens movement with no damping and a one-step lens movement with damping. For the response in FIG. 8, the software driver control of an actual camera module was configured to make a one step lens movement, and the frequency response (each division on the x-axis 20 ms) to study ring was evaluated from time T (time at when the one lens movement was made). As can be seen in FIG. 8, the amplitude of the ring is slowly dampened over 160 ms; this represents a severe ring that could adversely affect image quality and accuracy.

For the response in FIG. 9, the commanded one-step lens movement was broken up into 4 smaller lens movement steps (i.e., a wait time of 5 ms was employed such that the 4 steps were performed in 20 ms). All moves were completed in 20 ms. In particular, the amplitude in FIG. 9 is noticeably dampened; within 40 ms after the lens movements were completed in FIG. 9, the ring is significantly dampened, about the same amplitude as that in FIG. 8 after 120 ms. Accordingly, this comparison illustrates that by breaking a larger required lens movement into smaller steps, the ring can be dampened several times faster than without damping control. With less lens vibration, AF speed and control may improve.

FIGS. 10 and 11 illustrate results on lens displacement after an AF tracking run in an image capture device in which lens movements were made over every frame. For each of FIGS. 10 and 11, an AF tracking algorithm of an actual image capture device was simulated to calculate and generate lens move steps in each frame. In FIG. 10, since the AF run requires a lens movement every frame, it is difficult to separate the moves from each other due to the presence of ring in every lens movement, based on the springs 135 of the VCM resonating or vibrating against the lens barrel 120 of the lens 125.

For the response in FIG. 11, each lens movement per frame that was calculated by the AF tracking run was broken up into 4 smaller lens movement steps (i.e., a wait time of 5 ms was employed such that the 4 steps were performed in 20 ms). All moves were completed in 20 ms. As can be seen in FIG. 11 with the use of software damping control, the effects of the ring have been substantially reduced and are much less prevalent, so that the amplitude of lens movement due to vibration in the springs 135 is much smaller. This indicates that there will be less lens vibration and hence improved AF speed and control.

It will be appreciated that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, it will be appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method of reducing vibration imparted to a lens during movement of the lens in an image capture device, or embodying a method for damping vibration in springs of a voice coil motor of an image capture device. For example, the computer-readable medium can include instructions that causes a programmable processor to determine a lens movement requirement for the lens 125 of image capture device 200, to break up the determined lens movement into N smaller lens move steps, and to send a signal to move the lens in at least one of the N smaller steps to dampen the ring imparted to the lens 125. Additional instructions can cause the processor to insert a wait time after the at least one smaller lens move, and to repeat the send and insert steps for each of the remaining N lens move steps. Thus, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. An image capture device, comprising:
    an auto-focus (AF) unit configured to iterate an AF process to determine a lens position;
    wherein the AF unit is configured to divide a lens movement needed for the determined lens position into N smaller lens movements, N being set based on a frame rate and timing control of the image capture device; and
    a controller configured to move a lens in accordance with the determined lens position using a voice coil motor, the voice coil motor including springs which impart vibration to the lens during lens movement, and wherein the controller is configured to actively dampen vibration imparted by the springs to the lens during lens movement to the determined lens position.

2. The device of claim 1, wherein a lens movement determined by the AF process is broken up into N smaller lens movements, and the controller is configured to generate a drive signal to perform at least one of the N smaller movements so as to reduce an amplitude of vibration imparted to the lens via the springs.

3. The device of claim 1, wherein
    the AF unit is configured to reduce a determined lens movement into N smaller lens movements, and
    the controller is configured move the lens each of the N smaller lens movements to dampen vibration imparted by the springs.

4. The device of claim 1, wherein the AF unit is configured to divide a lens movement to the determined lens position into N smaller lens movements and wherein the AF unit is configured to insert a wait time between each smaller lens movement.

5. The device of claim 4, wherein the wait time between each smaller lens movement is variable.

6. The device of claim 4, wherein the wait time between each smaller lens movement is fixed.

7. The device of claim 4, wherein the wait time is set so that the lens stabilizes after each smaller lens movement, prior to making a next smaller lens movement.

8. An apparatus for reducing lens vibration in an image capture device, comprising:
- means for dividing a lens movement requirement into N smaller lens movements,
- means for moving the lens in a first of the N smaller lens movements,
- means for inserting a wait time after completing the first of the N smaller lens movements, and
- means for repeating the moving and inserting for subsequent smaller lens movements until the remaining N smaller lens movements have been completed,
- wherein the moving, inserting and repeating are completed within a processing time of one image frame.

9. The apparatus of claim 8, further comprising:
- means for determining the lens movement requirement in an auto-focus (AF) process implemented by the image capture device.

10. The apparatus of claim 8, wherein the combined lens displacement for the N smaller steps equals the lens movement requirement.

11. The apparatus of claim 8, wherein the means for moving the lens comprises a voice coil motor having springs which impart vibration to the lens during lens movement.

12. An apparatus for reducing lens vibration in an image capture device, comprising:
- a programmable processor configured to divide a lens movement requirement into N smaller lens movements, to insert a wait time after completing the first of the N smaller lens movements, and to repeat the moving and inserting for subsequent smaller lens movements until the remaining N smaller lens movements have been completed;
- an actuator configured to move the lens; and
- wherein the moving, inserting and repeating are completed within a processing time of one image frame.

13. The apparatus of claim 12, wherein the actuator comprises a voice coil motor.

14. The apparatus of claim 12, further comprising:
- an AF unit configured to determine the lens movement requirement in an auto-focus (AF) process implemented by the image capture device.

15. The apparatus of claim 12, wherein the combined lens displacement for the N smaller steps equals the lens movement requirement.

16. The apparatus of claim 12, wherein the wait time and N are set in advance.

17. The apparatus of claim 12, wherein the wait time is set so that the lens stabilizes after each smaller lens movement, prior to making a next smaller lens movement.

18. An image capture device, comprising:
- an auto-focus (AF) unit configured to iterate an AF process to determine a lens position, wherein the AF unit is configured to divide a lens movement to the determined lens position into N smaller lens movements and to insert a wait time between each smaller lens movement, N being set based on a frame rate and timing control of the image capture device, and wherein the wait time between each smaller lens movement is variable; and
- a controller configured to move a lens in accordance with the determined lens position using a voice coil motor, the voice coil motor including springs which impart vibration to the lens during lens movement, and wherein the controller is configured to actively dampen vibration imparted by the springs to the lens during lens movement to the determined lens position.

19. The device of claim 18, wherein the wait time is set so that the lens stabilizes after each smaller lens movement, prior to making a next smaller lens movement.

20. The device of claim 18, wherein the N smaller lens movements and wait time between each smaller lens movement are completed within a processing time of one image frame.

* * * * *